Sept. 2, 1930. H. B. McCABE 1,774,718
APPARATUS FOR BRINGING AN UNBALANCED ROTATIVE
BODY INTO A STATE OF BALANCE
Filed June 15, 1927 7 Sheets-Sheet 1

Inventor:-
Horace B. McCabe,
By Fisher, Towle, Clapp & Soans,
Attys.

Patented Sept. 2, 1930

1,774,718

UNITED STATES PATENT OFFICE

HORACE B. McCABE, OF MADISON, WISCONSIN, ASSIGNOR TO GISHOLT MACHINE COMPANY, OF MADISON, WISCONSIN, A CORPORATION OF WISCONSIN

APPARATUS FOR BRINGING AN UNBALANCED ROTATIVE BODY INTO A STATE OF BALANCE

Application filed June 15, 1927. Serial No. 199,025.

This invention relates to the art of determining the amount and location of unbalance in a rotative body which normally should be in a state of perfect balance with respect to its axis of rotation. More specifically, as to apparatus, the present invention relates to a type known as static balancing machines, wherein the unbalance is determined by restoring the state of equilibrium and observing the amount of force or torque required to do this in a plurality of different positions of rest.

The general object of the invention is to provide a simplified and improved apparatus for determining magnitude of the unbalance and likewise the angular distance of the radial direction of the unbalance from a predetermined radius on the rotative body.

Other more specific objects and advantages will be apparent as the invention becomes better understood by reference to the following detailed description, taken in connection with the accompanying drawings, in which—

Figs. 10 to 25 inclusive are views showing a practical and preferred form of balancing machine, the construction of which is based on the principles illustrated and described in connection with Figs. 1 to 8 inclusive, said views 10 to 25 being as follows:

Figure 1:
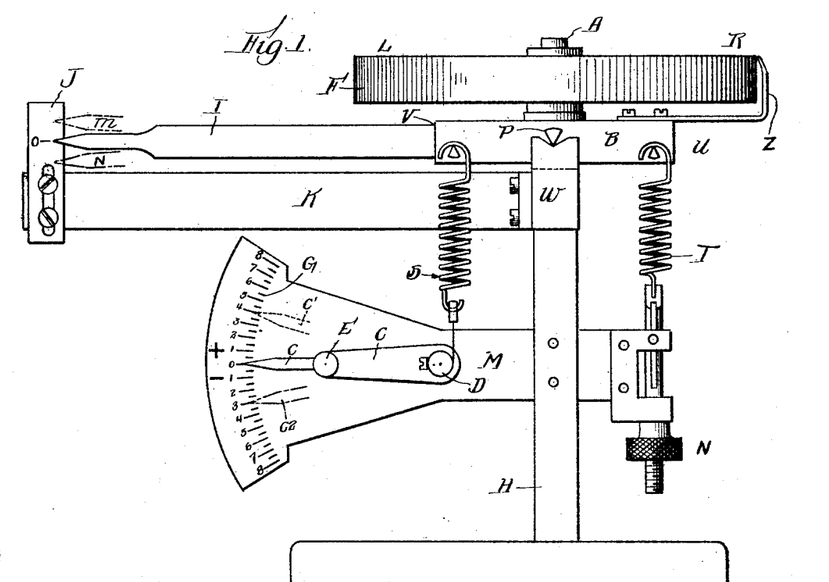
Fig. 1 is an elevation of a simple form of the invention designed mainly to disclose the operative principles thereof.

I will first describe the simple form of the invention shown in Fig. 1 and explain the working principle thereof, and, by reference to Figs. 2 to 9 inclusive, the method employed therewith for determining the magnitude and direction of unbalance.

In Fig. 1 the body to be balanced is shown as a fly-wheel F. This fly-wheel is mounted on a vertical stud A which projects upwardly from a bar B. This bar is provided with knife edge pivots P, which rest in V-shaped bearings in a bearing block W. The pivots P provide an axis on which the bar B can oscillate, and the parts are so positioned that this axis and the axis of the stud A are in the same plane.

Bearing block W is supported on a post H which is in turn mounted on a suitable base as shown. Connected to the bar B on opposite sides of the pivots are two springs S and T. The spring S, which may be termed the weighing spring, is adjustable for tension by means of a drum D about which a thin steel band is wrapped a part turn, the end of the same being secured to the drum by means of a small screw as shown. The drum is journaled in a plate M which is rigidly attached to the post H. The drum may be turned by means of a knob E on an arm C. Sufficient frictional or other resistance is provided in the construction to prevent the tension of the spring S from turning the drum. Arm C is provided with a pointer $c$ cooperating with a scale G, which is graduated to indicate the tension on the spring S in suitable units of measurement.

The dial G comprises two sections divided by the zero mark thereon. The values indicated by the spaces increase in opposite directions from the zero mark. The upper section of the dial is designated by the sign (+) and the lower section by the sign (−).

Attached to the bar B is an indicator arm I, which cooperates with an index mark on a stationary strip J to indicate a zero setting of the bar B and its load F. Strip J is adjustably secured to a supporting arm K which is rigidly attached to the bearing block W.

The spring T, which may be termed the setting spring, is connected by means of a knife edge pivot to the bar B on the opposite side of the fulcrum from spring S, and is adjustably held in tension by a thumb nut N. This spring acts to stabilize the bar B, and its adjustment by means of the nut N enables the indicator I to be readily brought to rest at the 0 position shown.

An index finger Z is attached to the bar B, the point of the same registering with the upper surface of wheel F. The point of the index finger lies in the radial plane perpendicular to the plane of pivots P. This index finger registers with division marks assumed to have been made on the edge of the wheel F, for the purpose of enabling the wheel to be turned on stud A through angular distances of 90° and 180°.

In the operation of the device, two preparatory adjustments should preferably be made. First, the index strip J should be so adjusted that when the indicator I registers with the 0 mark thereon, the stud A will stand exactly plumb. Second, with the pointer $c$ at the 0 mark on the dial G, the spring T should be adjusted by the thumb nut N to bring the indicator arm to register with the 0 mark on the strip J. These adjustments may be made with the wheel F removed from the stud A or, preferably, with a similar wheel in place that has previously been perfectly balanced.

In order to demonstrate the operation of the device in measuring unbalance, it will be assumed for the present that the wheel F is out of balance due to a preponderance of weight on the side of the wheel marked R. This preponderance of weight will cause the end U of bar B to be depressed, and the indicator I will be raised as shown by the dotted lines $m$. The indicator I is now brought back to register with the 0 mark on the strip J by raising the knob E to increase the tension of the weighing spring S. The position of the pointer $c$ will then indicate on the dial G the magnitude of the unbalance caused by the preponderance of weight at R.

If it be assumed that returning the indicator I to zero position on the strip J required a movement of the pointer $c$ upward to the graduation 4, as indicated by the dotted lines at $c'$, then the unbalance in wheel F in the direction to the right of the pivot plane would be 4 units.

The customary unit employed in measuring unbalance is the ounce inch, which is defined as the unbalance due to a weight of one ounce located at a radial distance of one inch from the axis of the rotative body. In connection with the device shown it may be defined as the turning moment about pivotal axis P caused by a force of one ounce acting on the bar B at a distance of one inch from the vertical plane through the pivotal axis. Assuming the weighing spring S to be so adjusted that the graduations on the dial G represent ounce inches unbalance, the dotted line position $c'$ of the pointer $c$ indicates that the magnitude of the unbalance in the wheel F in the direction R from the pivot plane is four ounce inches.

Now assuming that the unbalance in the wheel F were on the opposite side of the pivot plane or on the side marked L, then the end V of the bar B would be depressed and the indicator I would take a position indicated by dot and dash lines at $n$. Then, in order to return the indicator I to zero position the tension on weighing spring S must be slackened by moving the knob E downward. Assume that in the final adjustment of the spring S the pointer c rested in the position indicated by the dot and dash lines $c^2$, registering with the graduation mark 3. This would indicate that the unbalance in wheel F in the direction of L is 3 ounce inches.

The readings obtained as above described would indicate the true unbalance in the wheel F only if the preponderance of weight were concentrated in a radial direction perpendicular to the plane of the pivots P. Since the radial direction is more likely not perpendicular to the pivot plane, the dial readings indicate only what may be called one component of the force causing the unbalance. In order to determine the true unbalance and the radial direction, it is necessary to measure the other component of the force with the wheel F turned a quarter turn as will now be described.

Figure 2:
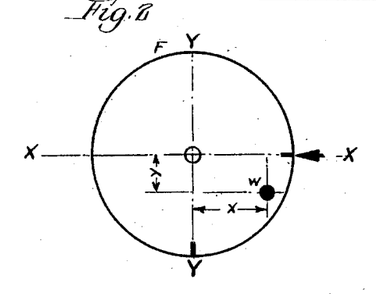
Figs. 2 and 3 are diagrams of the rotative body in two positions of rest relatively displaced angularly 90°, and wherein the quadrant in which the unbalance lies is assumed to be known.

To illustrate the method for determining the true magnitude and radial direction of the unbalance, reference is made to Fig. 2 in which F represents diagrammatically the wheel in Fig. 1. The line Y—Y represents the vertical plane through the pivots P and the line X—X represents a vertical plane perpendicular to plane Y—Y, and passing through the axis of the wheel.

Assume the wheel to be made of comparatively light material and the unbalance to be due to a concentrated weight $w$. For the purpose of demonstration this concentrated weight is shown in Fig. 2 located on the wheel at a distance $x$ from the pivot plane Y—Y and at a distance $y$ from the transverse plane X—X. The procedure in determining the magnitude and radial direction of unbalance in the wheel F is as follows:

We will assume that, in the initial setting of the wheel (Fig. 2), the weight $w$ rests in the position shown, which is at a distance $x$ from the pivot plane Y—Y and at a distance $y$ from the plane X—X. A measurement of the unbalance is taken as described in connection with Fig. 1. Assuming that the concentrated weight weighs $w$ ounces, and that the distance from the pivot plane is $x$ inches, the dial readings will indicate an unbalance equal to $w\,x$ ounce inches.

Figure 3:
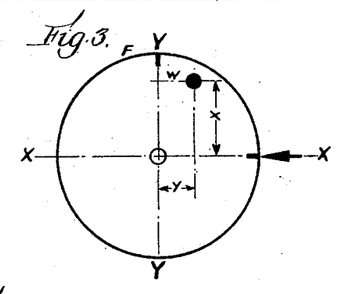

The wheel is now turned to the left through an angular distance of exactly 90°, bringing it to the position shown in Fig. 3. A second measurement for unbalance is now taken in the same manner, and this time the dial readings will indicate an unbalance equal to $w\,y$ ounce inches.

We have measured the two rectangular components of the force producing the unbalance. From these components the force producing the unbalance may be readily determined by laying out vectors representing two forces $w\,x$ and $w\,y$ to any convenient scale, as in Fig. 4. Then, by constructing the parallelogram of forces, the length and direction of the resultant $w\,r$ will represent the magnitude of the unbalance, and the angle $a$ which the resultant makes with $w\,x$ will represent the angular direction of $w$ with respect to the plane X—X.

Figure 4:
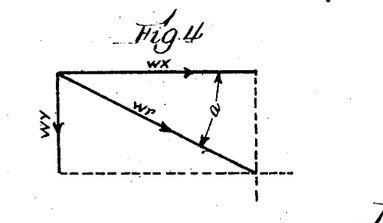
Fig. 4 is a diagram of the parallelogram of forces through the use of which the magnitude and position of the weight causing the unbalance as shown in Figs. 2 and 3 may be determined.

In the example just illustrated, it has been assumed that the weight $w$ is known to lie in the quadrant shown, and it is plain that the angle $a$ in Fig. 4 represents the direction of the unbalance with respect to the axis X—X. In practice it is not known in which quadrant the unbalance lies, and it is therefore necessary to employ some method to determine it.

The method I have devised may be understood by reference to Figs. 5 to 8 and 5A to 8A, in which the wheel F in Fig. 1 is represented diagrammatically. The vertical plane through the pivots is represented by the line Y—Y, and the stationary index finger Z is represented by the arrow head $e$.

The unbalance is assumed to be due to a concentrated weight $w$ as in Figs. 2 and 3. The face of the wheel is provided with marks at its circumference numbered 0, 90, 180, and 270, indicating degrees, and dividing it into four quadrants as shown. Figs. 5, 6, 7 and 8 show the wheel in the initial position for measurement, with the 0 mark registering with the stationary index $e$. Figs. 5A, 6A, 7A and 8A show the wheel turned 90° to the left, with the 90° mark registering with the index $e$.

Figure 5:
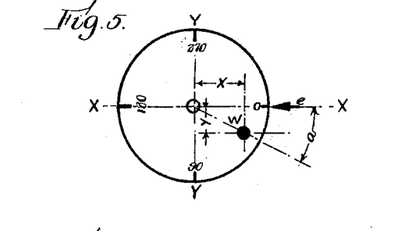
Figs. 5 and 5A to 8 and 8A inclusive are diagrams similar to Figs. 2 and 3, illustrating a method of determining the magnitude and location of the unbalance where it is not known in which quadrant the unbalance lies.
Figure 5A:
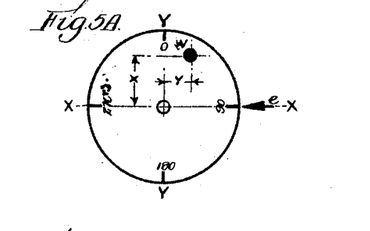

In Figs. 5 and 5A the weight $w$ lies in the quadrant included between 0 and 90°. In both figures it is on the right hand side of the pivot plane Y—Y and therefore the dial readings for both positions will be in the (+) section of the dial, and may be designated as (+) readings. Designating the angle of the radial direction from the plane X—X by $a$, the radial direction of $w$ may be described as $a$ degrees from plane X—X in a positive direction, or $(0+a)$ degrees.

Figure 6:
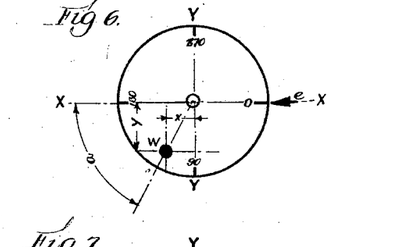
Figure 6A:
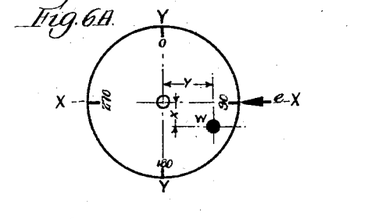

In Figs. 6 and 6A, the weight $w$ is shown in the quadrant included between 90° and 180°. In Fig. 6 it is on the left side, and in Fig. 6A it is on the right side, of the pivot plane Y—Y. Therefore, the first measurement taken with the wheel in the position in Fig. 6 will give a (−) reading, and the second readying taken with the wheel in the position in Fig. 6A will give a (+) reading. The radial direction of $w$ here is $a$ degrees from 180° in a negative direction, and may be said to be $180-a$ degrees.

Figure 7:
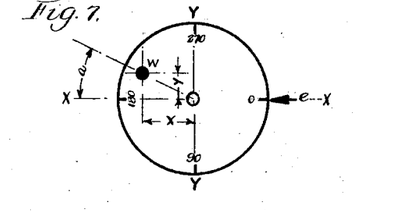
Figure 7A:
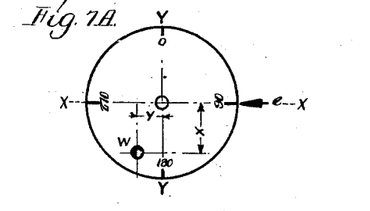

In Figs. 7 and 7A, the weight $w$ is shown in the quadrant between 180° and 270°. In both figures it is on the left hand side of the pivot plane Y—Y and, therefore, the dial readings for both measurements will be (−) readings. The radial direction is $a$ degrees from 180° in a positive direction, and may be designated as $180+a$ degrees.

Figure 8:
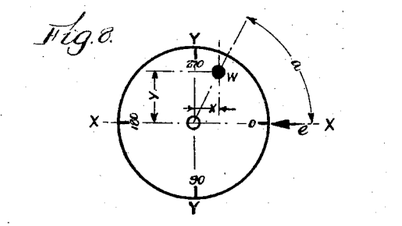
Figure 8A:
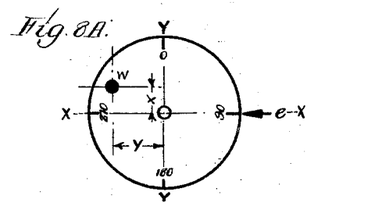

In Figs. 8 and 8A, the weight $w$ is shown in the quadrant between 270° and 0. In Fig. 8, it is on the right hand side, and in Fig. 8A on the left hand side of the pivot plane. Therefore, the first reading taken will be $a$ (+) reading and the second, $a$ (−) reading. The radial direction is $a$ degrees from 0, in a negative direction and may be described as $0-a$ degrees (in actual calculation 0 degrees is of course regarded as 360 degrees).

The above dial readings may be classified according to the positive and negative character of the readings as follows:

| Fig. No. | Character of readings | | Radial direction in degrees |
|---|---|---|---|
| | First | Second | |
| 5 and 5A | + | + | $0+a$ |
| 8 and 8A | + | − | $0-a$ |
| 7 and 7A | − | − | $180°+a$ |
| 6 and 6A | − | + | $180°-a$ |

Analyzing the above results, the following will be noted:

First—When the first reading is $a$ (+) reading, the angle $a$ is measured from the 0 mark.

Second—When the first reading is $a$ (−) reading the angle $a$ is measured from the 180° mark.

Third—When the two readings are alike in sign (either both + or both −) the angle $a$ is added.

Fourth—When the two readings are opposite in sign, the angle $a$ is subtracted.

Figure 9:
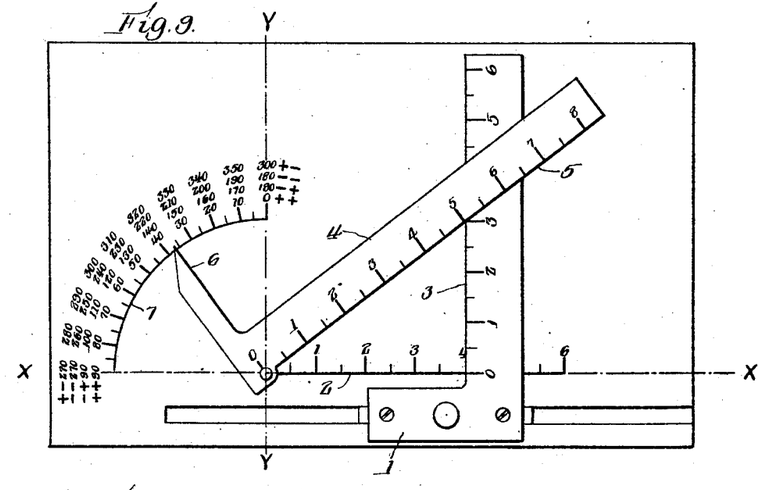
Fig. 9 is a plan view of a calculating device, through the use of which, in connection with the dial readings obtained in measuring unbalance, the angular direction of the unbalance in degrees measured from a zero mark on the rotative body may be ascertained.

In connection with a machine it is convenient to employ a calculating device such as shown in Fig. 9. This is based on the principle of the parallelogram of forces as shown in Fig. 4, and on the above analysis of dial readings for determining the angle.

Referring to Fig. 9, 1 is a slide which may be moved in a horizontal direction and set at any point along the scale 2, which has its zero mark on the vertical axis Y Y. This slide is provided with a vertical scale 3 starting with its zero mark on the line X X. 4 is a swinging arm pivoted at the intersection of X X and Y Y. This arm carries a scale 5, starting with its zero mark at the pivot. All three scales are graduated with equal spaces.

In using this calculating device, the slide #1 is set at a division on scale #2 corresponding to the dial reading taken in the measurment for unbalance in the first position of the wheel. The arm #4 is then swung until its lower edge registers with a division on scale #3 corresponding to the dial reading taken in the measurement for unbalance in the second position of the wheel. The reading of the scale #5 at the point where the edge of slide #1 intersects it indicates the magnitude of the unbalance in the wheel, measured in units of value according to the calibration of the weighing spring S on the machine.

A pointer #6 attached to the arm #4 at right angles to the latter sweeps a quadrant dial #7 divided into degrees. When the arm #4 is set according to the dial readings obtained in measuring unbalance, as above described, this pointer will indicate the angular direction of the unbalance in degrees measured from the 0 mark on the wheel. Each graduation mark on the quadrant represents one of four different values in degrees, depending on which quadrant the unbalance happens to be located in. These values are designated by four rows of numbers, the first or inner row increasing from 0 to 90°, the second from 90° to 180°, and so on to 360°. The different rows are designated by (+) and (−) signs according to the analysis above given. In reading the degrees indicated by the pointer on the quadrant, the row of numbers from which the value is to be read is determined by the (+) and (−) characteristics of the dial readings taken on the machine. Thus, if the first reading is (+) and the second reading is (−) the value will be read from the outer row of numbers. If both readings are (+) readings the value will be read from the first or inner row of numbers.

It has heretofore been assumed in the device shown in Fig. 1 that the pivotal axis and the axis of the stud A are in the same plane. In other words, the line of the knife edge pivots P intersects the axis of the stud A.

In practice it has been found very difficult to secure and maintain a relative adjustment of these parts sufficiently accurate for precise results. This is due to the fact that fly-wheels to be balanced are usually comparatively heavy and a very minute deviation from exact intersection of the two above-mentioned axes will make an appreciable error in the measurement.

To illustrate; suppose the wheel being balanced weighs 50 pounds, or 800 ounces. An error of .001″ in the relative adjustment of the two axes will throw the center of gravity of the wheel to one side of the plane of the pivots .001″, and this multiplied by the weight, 800 ounces, gives .8 ounce inches for the error in the measurement. Therefore, the method for obtaining the measurement for the magnitude of unbalance as described above is sufficiently accurate only for the requirements where a small error is permissible. In cases where precise measurements are required, the following indirect method should be employed.

The wheel is first set on the stud A in a preliminary position 180° from the measuring position. Then, with the pointer $c$ set at 0 on the dial, a zero setting of the indicator I is established by adjusting the spring T by means of the nut N. The wheel is then turned on the stud A to measuring position and the procedure is then the same as has been described.

In this case the pointer *c* will indicate exactly double the magnitude of the unbalance, and under the conditions previously assumed the pointer *c* would rest at the graduation 8 instead of 4. Therefore, when using this indirect method of measurement the dial is to be graduated with spaces of suitable width and numbered to indicate the true magnitude of the unbalance.

Two measurements are, of course, taken, with the measuring positions of the wheel 90° apart and the magnitude and direction of the unbalance is obtained in the manner described in connection with the diagrams, Figs. 2 to 8.

Figs. 10 to 25 inclusive illustrate a practical and commercial form of balancing machine, the construction of which is based on the principles above explained; and I will now proceed to describe the same by reference to said figures of the drawings.

The body to be balanced is here shown in the form of a fly-wheel 8 and is mounted on a vertical spindle 9 (Figs. 10 and 20) by means of an adapter 10 which is concentric with and rigidly connected to the spindle, and is turned to exactly fit the counterbore of the fly-wheel 8. A stud 11 on the adapter 10 fits into a hole in the fly-wheel to prevent the wheel from shifting on the adapter when rotated to different positions.

The spindle 9 has a conical portion $9^a$ which may turn in a correspondingly shaped seat in a sleeve member 12 (Fig. 20) which latter is adjustably mounted in the pivoted member 13. The lower end of spindle 9 carries a spiral gear 9′ which meshes with a similar spiral gear 14′ on a horizontal shaft 14. On the end of this shaft is mounted a dial wheel 15, the periphery of which is graduated in degrees. The end of the shaft adjacent the dial is journaled in a supporting bracket 16 attached to the pivoted member 13. This bracket is provided with a projecting portion 16′, the upper surface of which is flush with the graduated periphery of wheel 15. This surface bears an index mark registering with the graduation on the wheel 15. The wheel 15 may be adjusted on the shaft 14 by a set screw 17. This permits a relative adjustment of the dial and the spindle 9 if desired.

Clamped in V shaped depressions in the ends of member 13 (Fig. 25) are two hardened steel bars 18 which are of rectangular cross section. These bars, when clamped in place, have their edges in exact alignment and the lower edges thereof serve as knife edge pivots on which the member 13 can oscillate.

Figure 13:
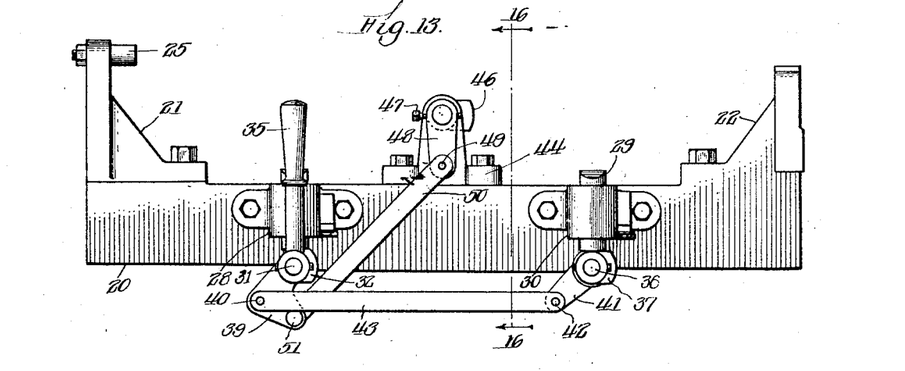
Figs. 13 and 14 are front and top views, respectively, of the supporting frame member of the machine, showing also mechanism for raising the pivoted member carrying the work from its bearings when mounting the work thereon and also for supporting the work in position to be drilled for the correction.
Figure 14:
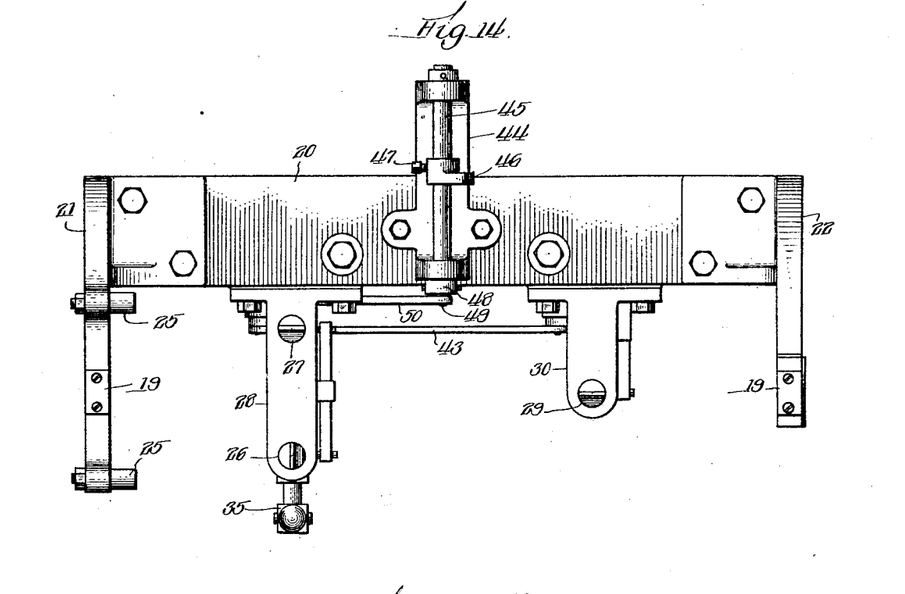

Referring to Figs. 13 and 14, the supporting base is designated by the number 20. Attached to this base at each end are side members 21 and 22. Secured to these members are the rectangular bearing blocks 19. These blocks are made of hardened steel and are secured to the side members 21 and 22 in such a manner that their upper surfaces are in the same plane.

Figure 15:
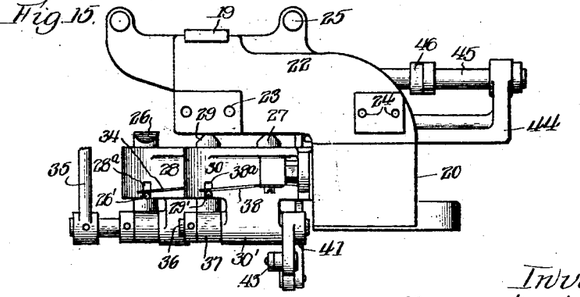
Fig. 15 is an end view of Fig. 13, viewed from the right of the latter.

Referring to Fig. 15, the side member 22 is provided with tapped holes at 23, for attaching the measuring unit shown in Fig. 21 and also at 24 for attaching a dash pot to be described later.

Figure 11:
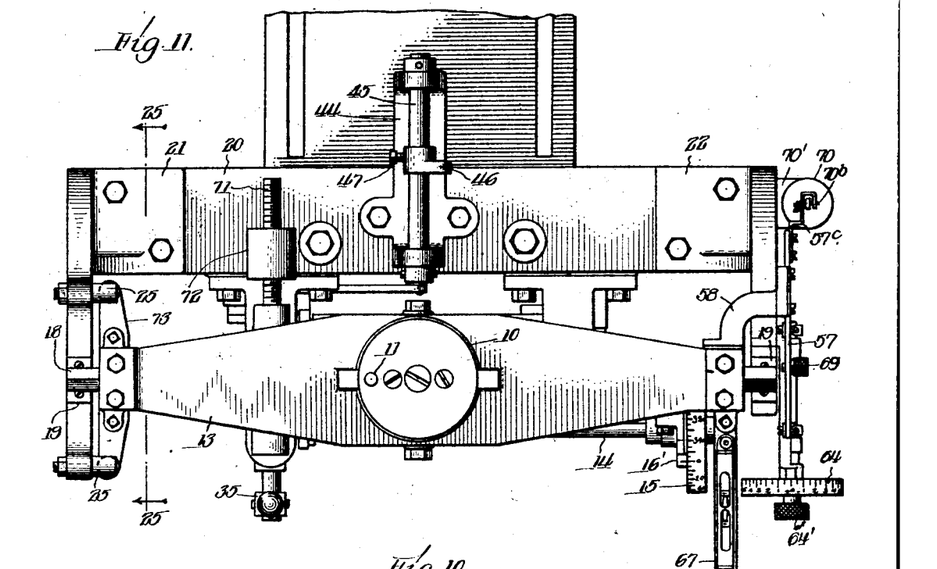
Fig. 11 is a top plan view, with the rotative body omitted for the sake of clearness.
Figure 16:
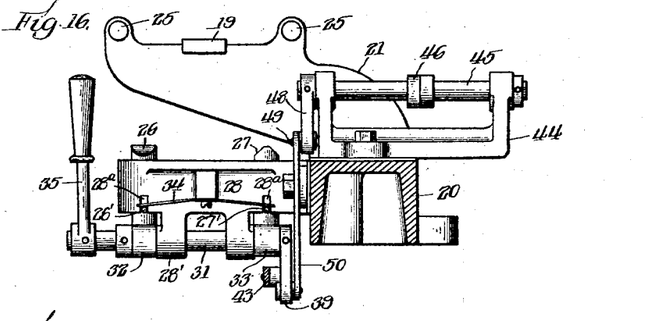
Fig. 16 is a vertical transverse section on the line 16—16 of Fig. 13.

Referring to Figs. 11 and 16, the side member 21 carries two projecting studs 25 which serve as stops to limit the oscillation of the pivoted member 13 as will later be described.

Figure 10:
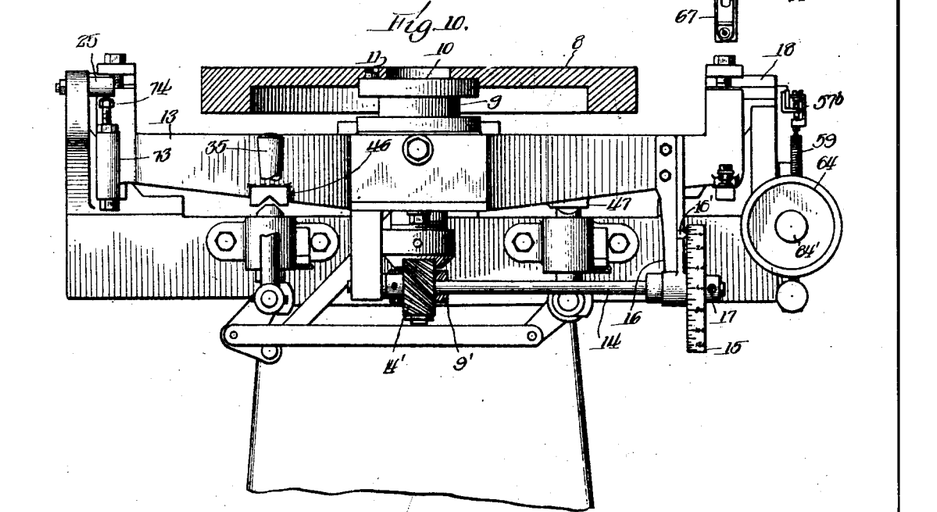
Fig. 10 is a front elevation, with the rotative body to be balanced appearing in section.

The pivoted member 13 rests with its knife edge pivots 18 on the bearing blocks 19 as indicated in Figs. 10 and 11. In order to protect the knife edges 18 from injury while mounting or removing work to be balanced, it is essential that the member 13 be raised slighty to lift the knife edges clear of the bearing blocks 19. The means provided for lifting the member 13 are best shown in Figs. 13, 14, 15 and 16.

26 and 27 designate two vertical plungers fitted to slide in holes bored in the projecting bracket 28, which is attached to the base 20 as shown. A similar plunger 29 is fitted to slide in a hole bored in the similarly projecting bracket 30 also attached to the base member 20.

Referring to Fig. 16, the lower side of bracket 28 is provided with a depending yoke portion 28′ in which is journaled a cam shaft 31. Two cams 32 and 33 are mounted on this shaft in position to engage the lower ends of plungers 26 and 27. The plungers are provided with pins 26′ and 27′ projecting through slots $28^a$ in the walls of bracket 28. A leaf spring 34 is secured to the bracket 28 so that its ends rest on these pins as shown. The plungers are thereby pressed downward against the faces of cams 32 and 33. The pins 26′ and 27′ also function to prevent the plungers from turning.

The outer end of shaft 31 is provided with a hand lever 35 for turning the shaft to raise and lower the plungers.

Referring to Fig. 15, the bracket 30 is provided with a depending portion 30′ in which is journaled a cam shaft 36, on which is mounted cam 37 engaging the lower end of plunger 29. Plunger 29 is normally depressed by a spring 38 resting on pin 29′ extending through slot $30^a$.

On the inner end of cam shaft 31 is an L-shaped crank arm 39 which, for convenience in construction, may be made integral with the cam 33. This crank arm carries a crank pin 40. Similarly, at the inner end of shaft 36 is a crank arm 41 carrying a crank pin 42. Crank pins 40 and 42 are each at the same radial distance from the shafts 31 and 36, They are connected by a link 43. Thus both shafts turn in unison when the lever 35 is operated and the three plungers are raised simultaneously by the cams.

The upper end of each plunger is formed with two angular flat surfaces, their planes forming an angle of about 90° as shown in Figs. 15 and 16. These ends fit into similarly formed depressions cut in the pivoted member 13 as seen at 46 and 47 in Fig. 10. When the lever 35 is in the upright position shown, the plungers are all in a depressed position and their upper ends are sufficiently clear of the depressions in bar 13 to allow the latter to oscillate freely. When the lever is turned to the left through an angle of about 90°, the cams raise the plungers into the depressions mentioned, and then raise the pivoted member 13 a slight distance above its position of rest, and support it with the knife edges lifted clear of the bearings 19. It will be noticed that the flat surfaces on the plungers 27 and 29 lie in a longitudinal direction relatively to bar 13 while those on plunger 26 lie in a transverse direction. Thus the three plungers function not only to lift the bar 13, but to hold it from shifting in either direction while the work is being mounted or removed, and to retain it in correct position while being lowered to rest again on the knife edges for the measuring operation.

Figures 12, 24:
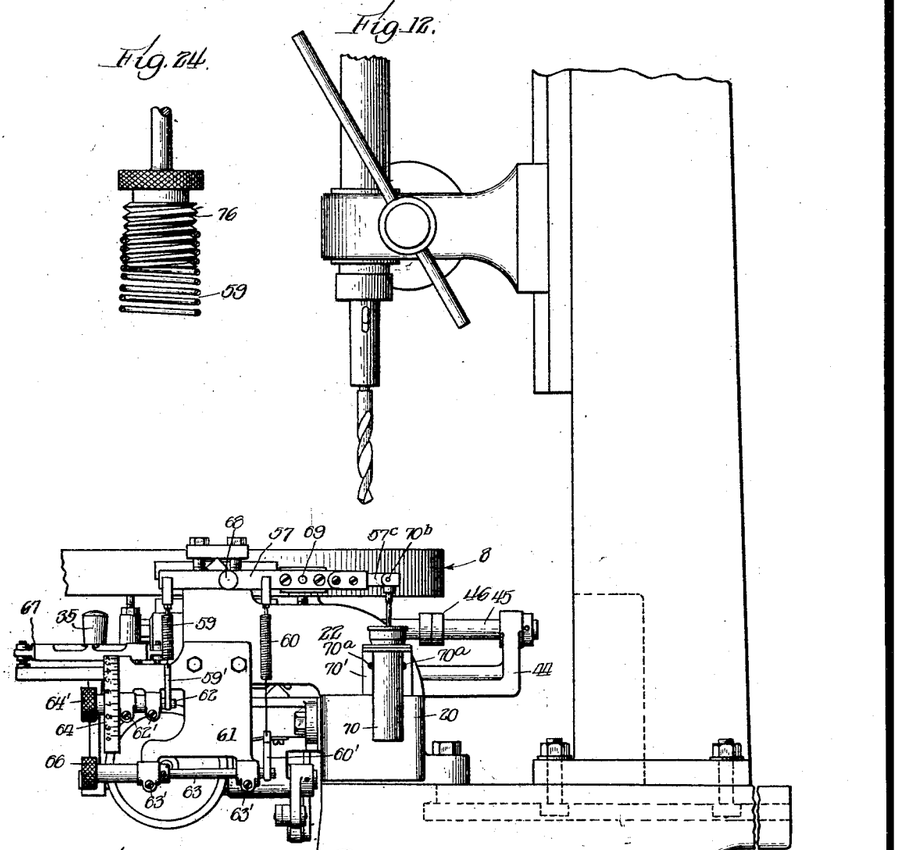
Fig. 12 is an end elevation, viewed from the right of Figs. 10 and 11, and showing also a drill spindle mounted in a position to apply the correction to the work while the latter is on the spindle of the balancing machine.
Fig. 24 is a detail elevation of the upper portion of the weighing spring showing a means for calibrating the latter.

When corrections for unbalance are made in the wheel by use of the drill spindle shown in Fig. 12, it is necessary to introduce some kind of a support under the rim of the wheel being balanced in order to offset the pressure of the drill. It is also necessary to provide a means for causing this support to recede from engagement with the wheel when the plungers are lowered and the pivoted member 13 is brought to rest on the knife edges in position for the taking of unbalance measurements.

To meet the above requirements a bracket 44 is secured to the base member 20 as shown in Figs. 11 and 12. Journaled in this bracket is a shaft 45 on which is mounted a cam 46. This cam is constructed with a correct radius to suit the width of the wheel being balanced. It is slidable on the shaft 45, and by means of the set screw 47 may be adjusted in different positions according to the radius of the wheel.

To operate this cam 46, the shaft 45 is provided with the crank arm 48 (Fig. 13) as shown. A crank pin 49 in this arm is connected by link 50 to a crank pin 51 in the crank arm 39. By this arrangement the shaft 45 is turned in unison with the cam shafts 31 and 36, and the cam 46 is turned to supporting position under the wheel simultaneously with the lifting of the pivoted member 13 from the knife edges. Likewise the cam 46 is turned to position to clear the wheel when the pivoted member 13 is lowered to rest on the pivots.

Figure 20:
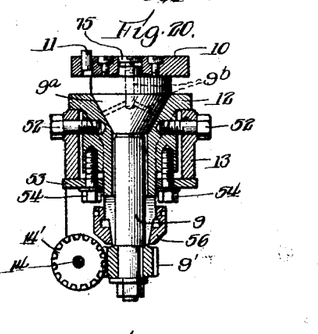
Fig. 20 is a vertical section through the pivoted member, and spindle bearing, on the line 20—20 of Fig. 18.

It is very important, especially in balancing comparatively heavy wheels, that the line of the knife edge pivots exactly intersect the axis of the spindle 9. In order to secure this result with the necessary precision, the sleeve 12 in which the spindle 9 is journaled, is provided with lateral adjustment. The means for this adjustment is best shown in Fig. 20. Two opposing cap screws 52 are threaded into opposite sides of the sleeve 12. These screws pass through and are shouldered against the side walls of the pivoted member 13 as shown. The method for determining the precise position for the spindle will be described later.

Figure 17:
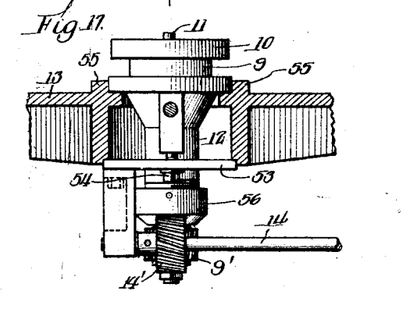
Fig. 17 is a vertical section through the central portion of the pivoted bar that carries the spindle on which the work is mounted, taken on the line 17—17 of Fig. 18, with the spindle and its bearing sleeve in elevation.
Figure 18:
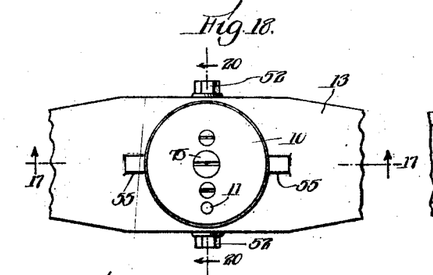
Fig. 18 is a top plan view of Fig. 17.
Figure 19:
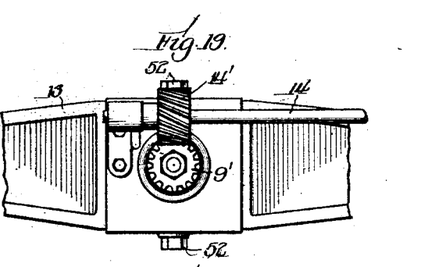
Fig. 19 is a bottom plan view of Fig. 17.

The lower portion of the sleeve 12 passes through a closely fitting opening in a clamping plate 53. By means of this plate and two cap screws 54, the sleeve 12 may be tightly clamped in place after adjustment. Movement of the sleeve 12 lengthwise of bar 13 is prevented by two lugs 55 which are integral with bar 13 (Figs. 17 and 18).

The lower portion of the sleeve 12 is split as shown in Fig. 20, and is encircled by a collar 56 with taper bore to provide a means to take up for wear on the lower bearing of the spindle.

Figure 21:
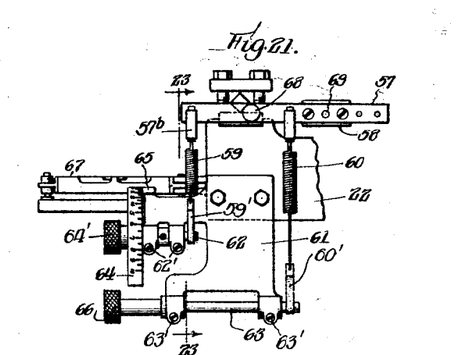
Fig. 21 is an end elevation of the measuring device, which also appears in association with other parts in Fig. 12.
Figure 22:
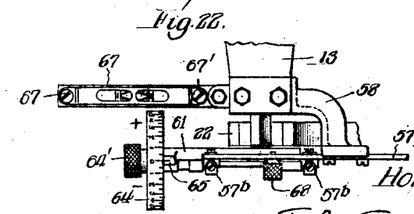
Fig. 22 is a top plan of Fig. 21.
Figure 23:
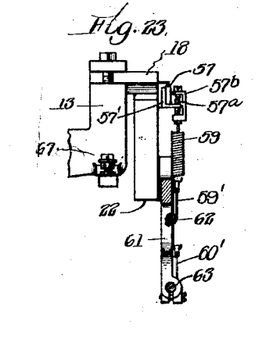
Fig. 23 is a vertical section on the line 23—23 of Fig. 21.

Referring to Figs. 21, 22 and 23, a horizontal bar 57 extending transversely of the line of the pivots is supported by a bracket 58 which is rigidly secured to one end of the member 13. Attached to this bar 57, in the position shown, are small L-brackets 57 supporting hardened steel studs 57$^a$ with conically pointed upper ends. These studs serve as pivot points for the attachment, through links 57$^b$, of springs 59 and 60.

Attached to the side member 22 by means of cap screws entering the holes 23 is a bracket 61, in which are journaled two shafts 62 and 63.

The projecting inner end of shaft 62 serves as a drum about which a thin steel band 59' wraps when the shaft is turned. The upper end of this band is provided with an eye through which is hooked the lower end of weighing spring 59. Thus the spring 59 may be adjusted for tension by turning the shaft 62. In like manner the projecting inner end of shaft 63 serves as a drum about which a thin steel band 60' wraps when the shaft is turned, so that the spring 60 may be adjusted for tension by turning the shaft 63.

Shaft 62 is provided with a dial 64 which may be turned by means of the thumb knob 64'. The periphery of this dial bears graduations spaced to represent any desired unit of measurement such as ounce inches. A projection 65 on the bracket 61 is made flush with the periphery of the dial 64 and bears an index mark cooperating with the graduations thereon.

The shaft 63 may be turned by means of a thumb knob 66. As the spring 60 is adjusted only for a zero setting of the pivoted member 13, no dial or index is required for this shaft. Adjusting screws 62' and 63' are provided for take-up on the bearings of the shafts 62 and 63 so that they will retain their adjustment.

For the purpose of indicating a zero position for the pivoted member 13 a spirit level 67 is rigidly attached to the same as shown, and equipped with adjusting screws 67'.

A counterweight made in the form of a thumb screw 68 is screwed into a threaded hole in the bar 57, as shown in Figs. 21 and 22. A second threaded hole 69 is provided in the bar at a definite distance from the first hole, so that the weight may be transferred to this hole for the purpose of an adjustment to be described later.

Referring to Figs. 11 and 12, a dash-pot 70 is mounted on the side member 22, being supported thereon by a bracket 70' secured to same by means of screws 70$^a$ entering the threaded holes 24 shown in Fig. 15. The dash-pot is of the usual construction, having a piston loosely fitting the cylinder which is partly filled with a suitable liquid. The plunger of the dash-pot is pivotally supported on a small pin 70$^b$ in an extension 57$^c$ attached to the bar 57, as shown. This dash-pot damps the oscillations of the pivoted member 13, serving the same purpose as when employed in connection with weighing scales.

It is necessary that all rotatable parts associated with the oscillating member 13, be in perfect static balance, and for that reason the stud 11 in the adapter 10 is made of such length that it will not completely fill the hole in which it is secured. Referring to Fig. 20, it will be seen that there is an opening below the stud equal in volume to the volume of that portion of the stud projecting above the adapter.

The unbalance in the dial wheel 15 which may be caused by the set screw 17 may preferably be compensated for by drilling a small hole of suitable size in the web of the wheel on the same side as the screw.

Figure 25:
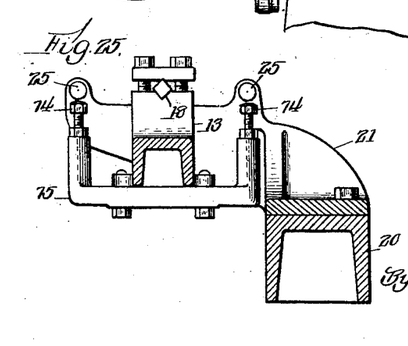
Fig. 25 is a transverse section on the line 25—25 of Fig. 11.

The knife edges being in the form of rectangular bars with four sharp edges and being clamped in the V-shaped depressions in the member 13, as shown in Fig. 25, they may, when worn, be removed and replaced with another edge downward to act as a pivot.

Referring to Fig. 11, 71 is a threaded stud projecting rearwardly from the member 13, which carries the adjustable counterpoise 72. The purpose of this counterpoise is to offset the weight of the parts associated with shaft 14, and to enable the member 13 to be approximately balanced.

73 is a cross bar attached to one end of member 13 as shown. At each end of this cross bar are upright portions in which screws 74 are threaded. These screws are in line with the studs 25 in the member 21. They serve to limit the oscillating movement of the member 13, and are so adjusted that when member 13 is in raised position, the screw heads will either be in contact with studs 25 or a very slight distance below.

Referring to Fig. 20, the top of spindle 9 is provided with oil ducts 9$^b$ for the purpose of receiving oil for the bearing, as shown by the dotted lines. A screw 75, fitting a central opening in adapter 10 which registers with central oil duct is for the purpose of preventing drill chips from entering said opening.

In the simple form of the invention shown in Fig. 1 an indicator I, cooperating with an index mark on the stationary plate J, is employed to indicate a zero setting, or what may be called a position of equilibrium for the pivoted member B. In the more fully developed machine it has been found an advantage to employ a fine spirit level for this purpose, principally for the reason that spirit levels can be made very sensitive so that the slightest movement will be greatly magnified.

By means of the adjusting screws 67' at the ends of the level 67 the latter may be adjusted so that the bubble rests central when the spindle 9 is plumb. This corresponds to the described adjustment of the index strip J.

The spring 60, in conjunction with the shaft 63 and knob 66 (Fig. 21) is for the purpose of bringing the pivoted member 13 to a position where the level bubble is at center, which may be called a position of equilibrium for the pivoted member. This corresponds to the adjustment of the spring T by nut N on the form shown in Fig. 1 to bring the bar B to a position of equilibrium with the indicator I at the zero mark.

Spring 59 (Fig. 21) is the weighing spring, and corresponds to the spring S (Fig. 1). The dial wheel 64 with its shaft 62 serves to adjust this spring for tension. When the dial is set at 0, the thin steel band 59' is wrapped about a half turn on the drum so that when the dial is turned to the right the tension is increased, and when turned to the left, the tension is decreased.

The divisions on dial 64 registering with the index mark 65 when the dial is turned to the right from the 0 mark, are designated by a (+) sign, while those registering with the index mark when the dial is turned to the left of 0, are designated by a (−) sign.

The deflection constant of the spring 59 may be adjusted to correspond with the desired measuring unit by screwing into it at the top end, a greater or less distance, a threaded plug 76, thus decreasing or increasing the number of active coils in the spring. A detail view of this arrangement on an enlarged scale is shown in Fig. 24. The proper adjustment of the plug is determined by means of the counterweight 68 which may be removed from the position shown and screwed into the hole 69. This hole is made a predetermined distance in inches from the first position of weight 68, and the weight 68 is made to weigh a predetermined amount in ounces.

The operation of adjusting the weighing spring 59 to obtain the correct deflection constant may be explained as follows: The counterweight 68 is first placed in the position shown, and the dial 64 is set at 0. The spring 60 is then adjusted by means of the knob 66 until the level indicates a position of equilibrium. The counterweight 68 is then removed and placed in the hole 69, thus destroying the equilibrium of the pivoted member. The dial 64 is then turned until the level bubble is central, restoring the state of equilibrium. The reading of the dial is then taken. When the adjustment of the spring is correct, the dial should read an amount corresponding with the turning moment about the knife edge pivots caused by the moving of weight 68 from its original position to the position in hole 69.

Suppose the distance between the two holes is 3", and that the counterweight 68 weighs one ounce. Moving a weight of one ounce a distance of 3" farther from the pivots introduces a turning moment of three ounce inches. Therefore, if the direct method of measuring unbalance as previously described is to be employed, the reading of the dial should be three ounce inches. If the indirect method later described is to be employed the spring should be so adjusted that the dial reading will be 1½ oz. inches.

The counterpoise weight 72 (Fig. 11) is for the purpose of roughly adjusting the balance of the pivoted member 13, as described. This adjustment is made with the dial 64 set at 0 and the tension band on spring 60 a part turn on the drum. Under these conditions the counterpoise 72 is adjusted until a state of equilibrium is indicated by the level.

The purpose of the lateral adjustment of spindle 9, shown in Fig. 20, is to enable the axis of the spindle to be set and maintained rigidly in a position intersecting the line of the knife edge pivots. A preferred method for testing the accuracy of this adjustment is to mount on the spindle a wheel, or any comparatively heavy object that is bored to fit the adapter 10, (or the end of the spindle if the adapter is removed) and that has been previously placed in a state of perfect static balance. With the dial 64 set at any desired division, a position of equilibrium for the pivoted member is first established by adjusting the knob 66 to bring the level bubble to a zero setting. Then the perfectly balanced wheel or heavy object is mounted on the spindle, and the position of the level bubble is noted. When the adjustment of the spindle has been correctly made, the position of the level bubble will not have changed, and the condition of equilibrium will not be disturbed after the wheel has been mounted.

When the direct method of measuring unbalance is employed, a permanent adjustment of the machine is first made by means of the counterweight 72, to bring the pivoted member 13 to a position of approximate equilibrium. Then with the dial 64 set at zero, knob 66 is adjusted until an exact position of equilibrium is established as indicated by the level bubble resting at the center of the level scale.

This direct method of measuring unbalance may now be described as follows: With the member 13 raised from the knife edges by means of the lever 35 a wheel to be balanced is mounted on the adapter 10, and the spindle is turned until the dial 15 reads 0. The member 13 is then lowered to weighing position, and the dial 64 is turned until the position of equilibrium is indicated by the level. The reading of the dial 64 is then taken and its (+) or (−) character noted. The slide #1 (Fig. 9) is set on scale 2 to correspond with this reading. The process is then repeated with the dial 15 set at 90° and a second reading of the dial 64 is taken, and its (+) or (−) character is noted. The arm 4 (Fig. 9) is then set on scale 3 to correspond with this reading.

The amount of the unbalance is read from scale 5, and the angular direction is indicated by the pointer 6. The proper row of figures designating the angle is determined by the relation of the (+) and (−) characters of the two successive readings as previously explained. The wheel 8 is then turned until the dial 15 registers the angle determined by the above calculations bringing the proper location for correction (weight to be removed) under the drill spindle and the correction is drilled. The depth of hole to be drilled is usually determined by a suitable chart previously prepared according to the diameter of the drill, its radial distance, and the specific gravity of the material in the wheel.

When precision is desired, the indirect method of balancing may be employed, as follows. With the member 13 raised from the pivot bearings by means of the lever 35, the wheel is mounted on the adapter as shown in Figs. 10 and 12, and the spindle is rotated by turning the wheel until the dial 15 reads 180°. Member 13 is then lowered to rest on the knife edges, dial 64 is set at 0, and knob 66 is adjusted until a position of equilibrium is indicated by the level. The member 13 is then raised by the lever and the wheel is turned to bring the dial 15 to 0 position. Member 13 is again lowered and dial 64 is turned until the condition of equilibrium is established as indicated by the level. The reading on dial 64 is then taken and its (+)

or (—) character noted. The slide #1 (Fig. 9) is then set on scale 2 to correspond with this reading. The above procedure is repeated with the initial setting of the dial 15 at 270° and the second setting at 90°, a second reading of the dial 64 is taken and its (+) or (—) character noted. The arm 4 (Fig. 9) is then set on scale 3 to correspond with this reading. The balance of the procedure in determining the resultant amount and radial direction, and making a correction, are the same as in the preferred method above described.

I claim—

1. In a device for measuring the moment of the force of gravity about a horizontal axis intersecting the vertical axis of an unbalanced rotative body, the combination of a pivoted member tiltable in a vertical plane, on which said body may be mounted with its axis intersecting the pivotal axis of said pivoted member, indicating means associated with said pivoted member whereby a position of rest with the axis of rotation of said body vertical is indicated, means for establishing a state of equilibrium of the pivoted member in said position of rest and before the body is mounted thereon, and means for measuring the moment of force about said pivotal axis required to restore the state of equilibrium after the body has been mounted on said pivoted member.

2. In a device for measuring the moment of the force of gravity about a horizontal axis intersecting the vertical axis of an unbalanced rotative body, the combination of a pivoted member tiltable in a vertical plane on which said body may be mounted with its axis intersecting the pivotal axis of said pivoted member, a spirit level associated with said pivoted member through which a position of rest with the axis of rotation of said body vertical is indicated, means for establishing a state of equilibrium of the pivoted member in said position of rest and before the body is mounted thereon, and means for measuring the moment of force about said pivotal axis required to restore the state of equilibrium after the body has been mounted on said pivoted member.

3. In a device for measuring the moment of the force of gravity about a horizontal axis intersecting the vertical axis of an unbalanced rotative body, the combination of a pivoted member tiltable in a vertical plane, on which said body may be mounted with its axis intersecting the pivotal axis of said pivoted member, indicating means associated with said pivoted member whereby a position of rest with the axis of rotation of said body vertical is indicated, adjustable elastic means for establishing a state of equilibrium of the pivoted member in said position of rest and before the body is mounted thereon, and means for measuring the moment of force about said pivotal axis required to restore the state of equilibrium after the body has been mounted on said pivoted member.

4. In a device for measuring the moment of the force of gravity about a horizontal axis intersecting the vertical axis of an unbalanced rotative body, the combination of a horizontally pivoted bar, and means whereby said body may be mounted thereon with its axis intersecting the pivotal axis of said bar to tilt in a vertical plane, indicating means associated with said bar whereby a position of rest with the axis of rotation of said body vertical is indicated, a spring and spring-tensioning means connected to said bar for establishing a state of equilibrium of said bar in said position of rest and before the body is mounted thereon, and means, including a weighing spring, for measuring the moment of force about said pivotal axis required to restore the state of equilibrium after the body has been mounted on said bar.

5. In a device for measuring the moment of the force of gravity about a horizontal axis intersecting the vertical axis of an unbalanced rotative body, the combination of a horizontally pivoted bar, and means whereby said body may be mounted thereon with its axis intersecting the pivotal axis of said bar and to tilt in a vertical plane, indicating means associated with said bar whereby a position of rest with the axis of rotation vertical is indicated, a setting spring and spring-tensioning means connected to said bar on one side of the pivotal axis thereof, and means, including a weighing spring and spring-tensioning means connected to said bar on the other side of the pivotal axis thereof for measuring the moment of force about said pivotal axis required to restore the state of equilibrium after the body has been mounted on said bar.

6. In a device for measuring the moment of the force of gravity about a horizontal axis intersecting the vertical axis of an unbalanced rotative body, the combination of a pivoted oscillating member provided with supporting means on which the body may be rotatively mounted so that its axis will tilt in a vertical plane, indicating means associated with said pivoted member to indicate a predetermined position of rest for same, adjustable means for establishing a state of equilibrium for the pivoted member in the position of rest as indicated by said indicating means, and means, including an adjustable weighing spring, for measuring the moments of force about said pivotal axis required to restore the state of equilibrium after the body has been mounted on said supporting means in different positions of said body around its axis of rotation.

7. In a device for measuring the moment of the force of gravity about a horizontal axis intersecting the vertical axis of an unbalanced rotative body, the combination of a horizontally pivoted bar, a spindle journaled vertically in said bar to support said body, a dial for indicating angular movements geared to and actuated by said spindle, indicating means associated with said pivoted bar to show a position of rest with the axis of said spindle vertical, adjustable elastic means for establishing a state of equilibrium of said bar in said position of rest and before the body is mounted on said spindle, and means for measuring the moment of force about the pivotal axis of said bar required to restore the state of equilibrium after the body has been mounted on said spindle.

8. In a balancing machine of the character described, the combination of a frame, a horizontal bar pivotally supported at its ends on said frame, a vertical bearing sleeve mounted in said bar, a spindle journaled in said sleeve, an adapter on the upper end of said spindle to support a rotative body to be balanced, means for adjusting said bearing sleeve laterally whereby to bring the axis of said spindle into intersecting relation to the pivotal axis of said bar, and means other than said adjusting means for locking said sleeve in adjusted position.

9. In a balancing machine of the character described, the combination of spaced frame members, bearing blocks carried by said frame members, a horizontal bar carrying at its ends knife edge pivots supported on said bearing blocks, a vertical spindle journaled in said horizontal bar, an adapter on the upper end of said spindle to support a rotative body to be balanced, vertically movable plungers beneath said bar, guides for said plungers, and means for simultaneously raising said plungers into lifting contact with said bar, the bottom of said bar and the tips of said plungers having interfitting parts adapted, when said bar is raised, to hold the same against endwise and sidewise displacement.

10. In a balancing machine of the character described, the combination of a frame, a horizontal bar pivotally supported at its ends on said frame, a vertical spindle journaled in said bar with its axis intersecting the pivotal axis of said bar, an adapter on the upper end of said spindle to support a rotative body to be balanced, a drill spindle mounted on said frame in a position to apply the correction for unbalance to said body without removing the latter from said adapter, a rock shaft, and a cam mounted on said rock shaft to support said body from beneath during the application of the correction by said drill spindle, said cam being adjustable lengthwise of said rock shaft.

11. In a balancing machine of the character described, the combination of spaced frame members, bearing blocks carried by said frame members, a horizontal bar carrying at its ends knife edge pivots supported on said bearing blocks, a vertical spindle journaled in said horizontal bar, an adapter on the upper end of said spindle to support a rotative body to be balanced, vertically movable plungers beneath said bar, guides for said plungers, cams for raising said plungers, a drill spindle mounted in a position to apply the correction for unbalance to said body while on said adapter, a cam for supporting said body from beneath during the operation of said drill spindle, and a common actuating means for all of said cams.

12. In a static balancing machine, the combination of a frame, a horizontal bar pivoted at its ends on said frame, a spindle journaled in said bar with its axis perpendicular to and intersecting the pivotal axis of the latter, and adapted to support a rotative body to be balanced, a level mounted on said bar crosswise of the pivotal axis of the latter, a setting spring suspended from said bar on one side of said pivotal axis, a shaft journaled in said frame, a flexible member connected to said spring and wound on said shaft, and a manually operable member on said shaft for turning the same.

13. In a static balancing machine, the combination of a frame, a horizontal bar pivoted at its ends on said frame, a spindle journaled in said bar with its axis perpendicular to and intersecting the pivotal axis of the latter, and adapted to support a rotative body to be balanced, a level mounted on said bar crosswise of the pivotal axis of the latter, a setting spring suspended from said bar on one side of said pivotal axis, a shaft journaled in said frame, a flexible member connected to said spring and wound on said shaft, a manually operable member on said shaft for turning the same, a weighing spring suspended from said bar on the other side of said pivotal axis, a second shaft journaled in said frame, a flexible member connected to said weighing spring and wound on said second shaft, a dial on said second shaft, a fixed index on said frame cooperating with said dial, and a manually operable member on said second shaft for turning the same.

14. In a static balancing machine, the combination of a frame, a horizontal bar pivoted at its ends on said frame, a spindle journaled in said bar with its axis perpendicular to and intersecting the pivotal axis of the latter, and adapted to support a rotative body to be balanced, a level mounted on said bar crosswise of the pivotal axis of the latter, a setting spring suspended from said bar, a shaft journaled in said frame, a flexible member connected to said spring and wound on said shaft, a manually operable member on said shaft for turning the same, a weighing spring suspended from said bar, a second shaft journaled in said frame, a flexible member connected to said weighing spring and wound on said second shaft, a dial on said second shaft, a fixed index on said frame cooperating with said dial, a manually operable member on said second shaft for turning the same, and a dash pot mounted on said frame with its plunger connected to said pivoted bar for damping the oscillations of the latter.

15. In a static balacing machine, the combination of a frame, a horizontal bar pivoted at its ends on said frame, a spindle journaled in said bar with its axis perpendicular to and intersecting the pivotal axis of the latter, and adapted to support a rotative body to be balanced, a level mounted on said bar crosswise of the pivotal axis of the latter, a setting spring suspended from said bar on one side of said pivotal axis, a shaft journaled in said frame, a flexible member connected to said spring and wound on said shaft, a manually operable member on said shaft for turning the same, a weighing spring suspended from said bar on the other side of said pivotal axis, a second shaft journaled in said frame, a flexible member connected to said weighing spring and wound on said second shaft, a dial on said second shaft, a fixed index on said frame cooperating with said dial, a manually operable member on said second shaft for turning the same, and a counterweight on a member carried by said pivoted bar adjustable to different distances from the pivotal axis of the latter.

16. In a static balancing machine, the combination of a frame, a horizontal bar pivoted at its ends on said frame, a spindle journaled in said bar with its axis perpendicular to and intersecting the pivotal axis of the latter, and adapted to support a rotative body to be balanced, a level mounted on said bar crosswise of the pivotal axis of the latter, a setting spring suspended from said bar on one side of said pivotal axis, a shaft journaled in said frame, a flexible member connected to said spring and wound on said shaft, a manually operable member on said shaft for turning the same, a weighing spring suspended from said bar on the other side of said pivotal axis, a second shaft journaled in said frame, a flexible member connected to said weighing spring and wound on said second shaft, a dial on said second shaft, a fixed index on said frame cooperating with said dial, a manually operable member on said second shaft for turning the same, and cooperating stop devices for limiting the extent of oscillating movement of said pivoted bar.

HORACE B. McCABE.